Jan. 16, 1923.
T. F. BUTLER.
SHOCK ABSORBER.
FILED FEB. 3, 1921.
1,442,646.
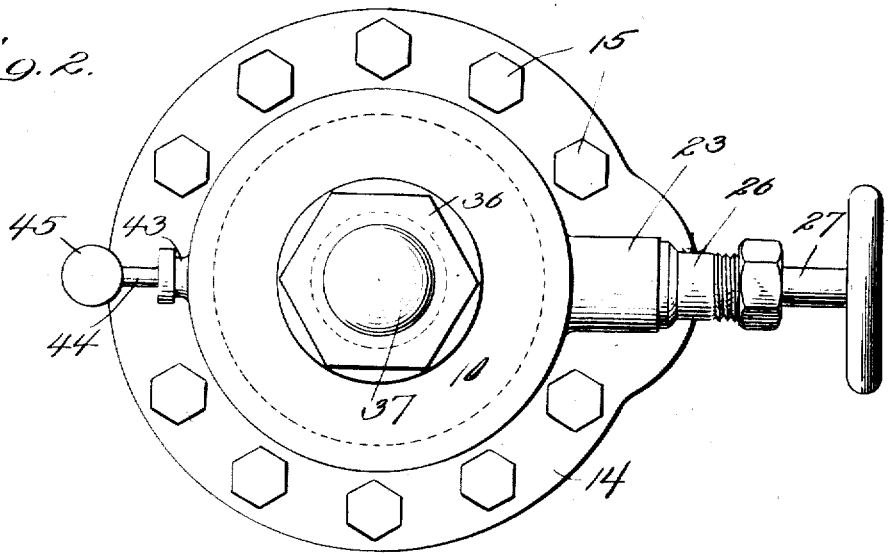
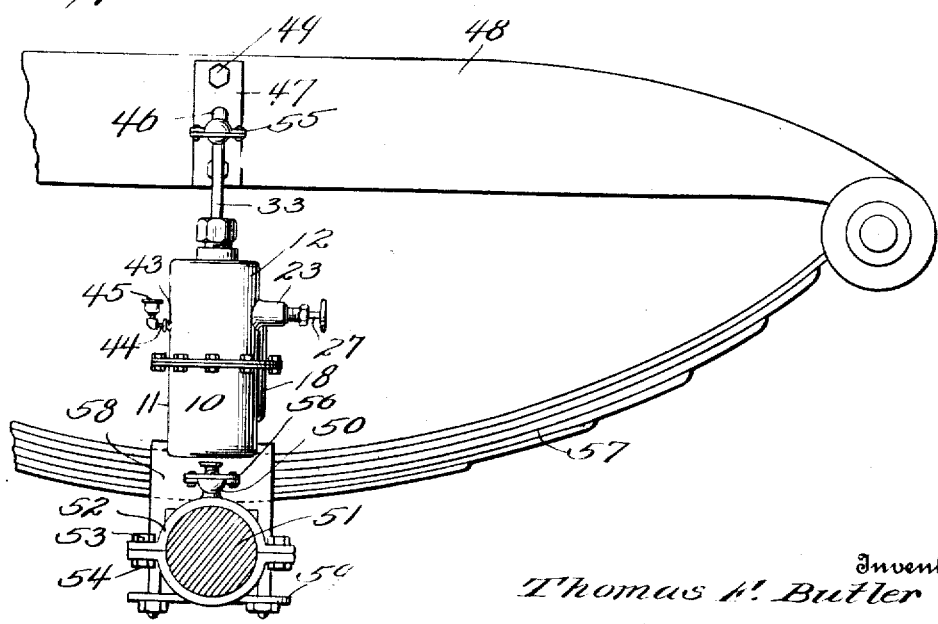
Inventor
Thomas F. Butler Patented Jan. 16, 1923.

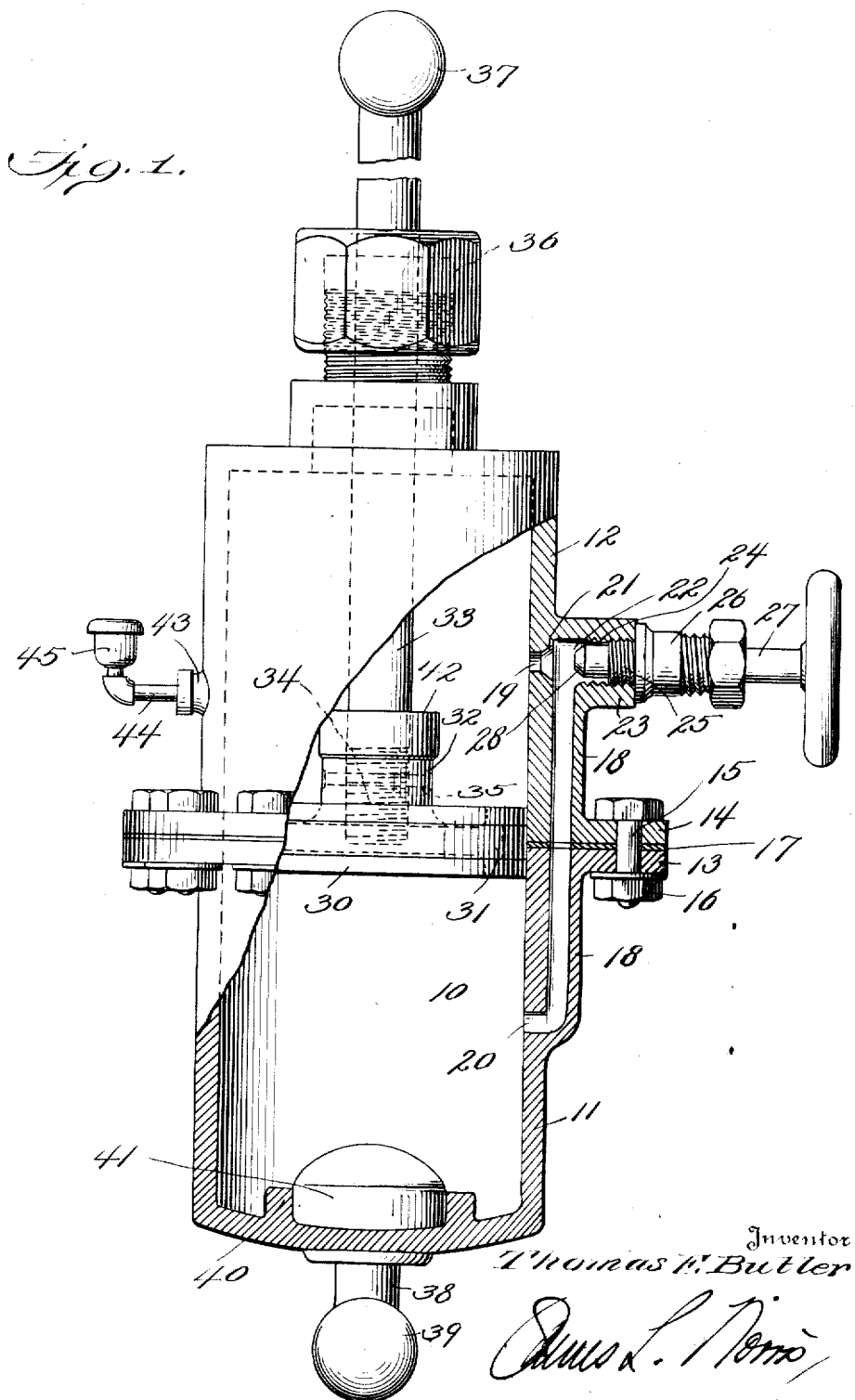

1,442,646

UNITED STATES PATENT OFFICE.

THOMAS F. BUTLER, OF LORAIN, OHIO.

SHOCK ABSORBER.

Application filed February 3, 1921. Serial No. 442,167.

*To all whom it may concern:*

Be it known that I, THOMAS F. BUTLER, a citizen of the United States, residing at Lorain, in the county of Lorain and State of Ohio, have invented new and useful Improvements in Shock Absorbers, of which the following is a specification.

This invention relates to a shock absorber and is primarily intended for use on motor vehicles but is capable of general application wherever it is desired to reduce the shock produced in resisting the motion between relatively movable parts.

The invention is described in the following specification with reference to its application to a motor vehicle in which the frame is supported upon the axle by means of springs. The shock absorbing functions of a device constructed in accordance with this invention do not come into play to any great extent unless the vehicle is subjected to shocks of some magnitude, the supporting springs being depended upon to afford sufficiently easy riding qualities for slight unevenness of the road surface.

The primary object of my invention therefore is to relieve the vehicle and its driving mechanism of severe and uncomfortable shocks and for this purpose a cylinder and piston are provided, the upper and lower portions of the cylinder being connected by a by-pass and the normal position of the piston being intermediate the outlets of said by-pass. Under normal conditions, atmospheric pressure exists in the cylinder, but when the relative movements between the frame and the axle of the vehicle exceed a certain amount the piston will move beyond an opening of the by-pass and proceed to compress air in the corresponding closed end of the cylinder, and the air thus compressed yieldingly takes up the shock.

Having briefly stated the general nature and objects of my invention I will proceed to describe the same more in detail in connection with the accompanying drawings.

In the drawings:—

Figure 1 represents a side elevation of a device constructed in accordance with my invention with parts broken away to show the by-pass and movable piston.

Figure 2 is a plan view of the device.

Figure 3 is a side elevation of the preferred form of my invention in operative position between the frame and the axle of a motor vehicle.

Referring to Figure 1, the numeral 10 designates a hollow cylinder which is preferably composed of two parts, a lower part 11 and an upper part 12. These upper and lower parts are provided with outward projecting annular flanges 13 and 14 formed with registering apertures for receiving the bolts 15 having the nuts 16 engaging their threaded ends. A gasket 17 is inserted between the flanges so that the parts of the cylinder are secured together in air-tight relation.

The two portions of the cylinder are each formed with a rib or protuberance which projects outwardly and these ribs or protuberances 18 are cored or drilled so that when the portions of the cylinder are assembled the two hollow ribs will form a continuous passage or by-pass opening into the upper and lower portions of the cylinder at 19 and 20 respectively in spaced relation to the closed ends thereof. The opening at 19 is formed with a beveled valve seat 21, and the rib 18 is extended outwardly at 23 and formed with an opening 22, co-axial with the opening 19 and valve seat 21. The extended portion or annular boss 23 is provided with threads 24 adapted to engage corresponding threads 25 of a valve-casing 26. A valve stem 27 is longitudinally adjustable in the valve casing 26 and has a beveled formation 28 at is lower end adapted to engage its valve seat 21 or restrict the passage therethrough as may be desired.

A piston 30 is slidably mounted within the cylinder 10 and is formed with an annular groove for receiving the piston-ring or packing 31. The piston is provided with an upstanding boss 32 to which the piston-rod 33 is connected by means of the screw-threads 34 and a pin 35 passing through aligning apertures in the boss and piston-rod. The piston-rod 33 extends through a stuffing-box 36 and is provided at its upper end with a ball 37. The lower end of the cylinder 10 is provided with an extension 38 terminating in a globular end 39. The interior of the lower wall of the cylinder is formed with an annular flange 40 adapted to receive a rubber bumper 41. A collar of rubber or other resilient material 42 is also placed about the piston-rod 33 and abuts against the boss 32 of the piston for yieldingly limiting the upward stroke of the piston.

The upper half 12 of the cylinder is formed with an outwardly extending boss 43 having a screw-threaded aperture therein for receiving the pipe connection 44 which is connected to an oil cup 45 whereby the cylinder walls are sufficiently lubricated.

Figure 3 shows the piston-rod 33 connected with the socket end of the horizontally extending arm 46 which is integral with a bracket 47, the latter being secured to the frame 48 of the vehicle by means of the bolts 49. The ball 39, at the lower end of the cylinder 10, is received within a socket 50 which is secured to the axle 51 of the vehicle by means of the split-strap 52 having abutting flanges whereby the two halves of the strap are secured together by means of bolts 53 and nuts 54. The balls 37 and 39 are retained in their corresponding socket members by means of the plates 55 and 56 respectively, which engage the ball beyond the diameter thereof. The spring 57 of the vehicle is secured to the axle 51 in the usual manner by means of the spring-clip 58 and an apertured plate 59.

In operation, it is evident that the spring 57 will take care of slight relative movements between the frame 48 and the axle 51. These slight movements being accompanied by corresponding movements of the piston 31 in the cylinder which cause a transfer of air from one-half of the cylinder to the other through the by-pass until the piston closes or passes beyond one of the open ends of the by-pass. For the purpose of illustrating the action of the mechanism it may be assumed that the frame is given a violent motion toward the axle so that the piston 31 moves beyond the opening 20 of the by-pass. Any further movement of the piston is now resisted by the air trapped in the lower end of the cylinder which offers greater and greater resistance to the movement of the piston until the same is checked with a cushioning action. Under the action of this compressed air and the tension of the spring 57 the frame may now rebound and carry the piston beyond the upper opening of the by-pass in which case air will be compressed in the upper portion of the cylinder in like manner. If it is desired to increase the resistance through the by-pass 20, valve 28 may be moved closer to this seat so that the volume of air, on sudden motion of the piston 31, trapped within the closed ends of the cylinder will be greater than if the by-pass were unobstructed.

It will be understood that the valve 28 may be adjusted to suit the varying conditions of the load and the rigidity of the springs. Furthermore the particular construction described and shown has been chosen for illustrative purposes merely and the invention as defined by the claim hereunto appended, may be otherwise embodied and applied without departing from the spirit and scope thereof.

Having described my invention what I claim as new and desire to secure by Letters Patent, is:—

In a vehicle the combination with the frame of the vehicle and the axle thereof, of a spring interposed between said frame and axle for carrying the load, and a shock absorbing device inserted between said frame and axle comprising a cylinder, a piston therein, said piston normally occupying a position approximately in the center of the cylinder, and a by-pass opening into the cylinder on opposite sides of said piston and in spaced relation to the closed ends of the cylinder, whereby small relative movements between said frame and axle are chiefly resisted by said spring and large relative movements are resisted by said spring and the air compressed between said piston and one end of the cylinder after the piston has closed said by-pass a valve controlling the flow of air through said by-pass and a resilient rubber bumper in the lower end of said piston chamber.

In testimony whereof I have hereunto set my hand in presence of two subscribing witnesses.

THOMAS F. BUTLER.

Witnesses:
B. I. KAHMES,
A. C. SMITH.